United States Patent [19]

Tezuka

[11] Patent Number: 5,046,036
[45] Date of Patent: Sep. 3, 1991

[54] PSEUDORANDOM NUMBER GENERATOR

[75] Inventor: Shu Tezuka, Tokyo, Japan

[73] Assignee: International Business Machines Corporation, Armonk, N.Y.

[21] Appl. No.: 171,213

[22] Filed: Mar. 18, 1988

Related U.S. Application Data

[63] Continuation of Ser. No. 773,486, Sep. 9, 1985, abandoned.

[30] Foreign Application Priority Data

Oct. 15, 1984 [JP] Japan ................... 59-214467

[51] Int. Cl.$^5$ ............................................. G06F 7/38
[52] U.S. Cl. .................................................. 364/717
[58] Field of Search ............... 263/717, 724, 728, 736; 307/471; 331/78

[56] References Cited

U.S. PATENT DOCUMENTS

| | | | |
|---|---|---|---|
| 3,742,381 | 6/1973 | Hurd | 331/78 |
| 3,811,038 | 5/1974 | Reddaway | 331/78 |
| 4,161,041 | 7/1979 | Butler et al. | 364/717 |
| 4,408,298 | 10/1983 | Ruhland | 364/717 |
| 4,493,046 | 1/1985 | Watanabe | 364/717 |
| 4,774,681 | 9/1988 | Frisch | 364/717 X |

FOREIGN PATENT DOCUMENTS 2172460 9/1973 France .
2163627 2/1986 United Kingdom ............... 364/717

OTHER PUBLICATIONS

Latawiec, K. J., "New Method of Generation of Shifted Linear Pseudorandom Binary Sequences," *Proc. IEEE*, vol. 121, No. 8, Aug. 1974, pp. 905-906.

*Primary Examiner*—Dale M. Shaw
*Assistant Examiner*—Tan V. Mai
*Attorney, Agent, or Firm*—Marc A. Block; Marc D. Schechter

[57] ABSTRACT

A pseudorandom number generator includes:
an M-sequence generator having a plurality of stages $a_i$; and
a matrix product circuit which combines a matrix G having components $g_{ji}$ with the stages $a_i$ to provide output elements $b_j$ of a number, each $b_j$ being represented by the expression, $$b_j = \Sigma_i a_i g_{ji}.$$

9 Claims, 5 Drawing Sheets

PSEUDORANDOM NUMBER GENERATOR

This is a continuation of application Ser. No. 06/773,486, filed on Sept. 9, 1985, now abandoned.

BACKGROUND OF THE INVENTION

1. Field of the Invention

This invention relates to a pseudorandom number generator using a shift register circuit, and more particularly to a pseudorandom number generator which can generate high-quality random numbers with a simple configuration.

2. Description of Related Technology

Uniformly distributed random number generators using a maximum length shift register sequence generator (hereinafter called M-sequence generator) are recently attracting attention. The M-sequence generator is that in which the constant polynomial is selected from the primitive polynomial on the Galois field, and in which the period of output sequence is maximized within the range where the constant polynomial has the same order. Of course, consideration must be given to manner in which the elements are taken out of the series generated by the M-sequence generator to use them as a random number. For instance, when random numbers are selected from an M-sequence $\{a_i\}$ as $\{a_j, \ldots, a_{j+k}\}$, $\{a_{j+1}, \ldots, a_{j+k+1}\}$, $\{a_{j+2}, \ldots, a_{j+k+2}\}$, there is a strong correlation between consecutive random numbers, which is inadequate.

As dominant methods to generate uniformly distributed random numbers from an M-sequence, the Tausworthe method and the Lewis and Payne method are known.

In the Tausworthe method, an l-bit binary decimal $$W_i = 0.a\sigma_{i+r-1} a\sigma_{i+r-2} \cdots a_{it+r-l}$$

is obtained by arranging l consecutive elements of the M-sequence $\{a_i\}$, ($l \leq p$, p=dimension number of a constant polynomial), and it is made to be a random number. In the above equation, $\sigma$ is the distance at which l consecutive elements are taken out from the M-sequence. This method is summarized in FIG. 5. In random numbers thus generated, if the period T of the M-sequence and distance $\sigma$ are selected to be prime with each other, the cycle of $\{W_i\}$ also becomes T, and "0" appears $2^{p-l}-1$ times and each of other elements appears $2^{p-l}$ times in a period. Therefore, if p is sufficiently larger than l, it is seen that these random numbers are uniformly distributed.

The Lewis and Payne method uses $$f(D) = D^p + D^q + 1 \quad (p > q)$$

as a characteristic equation, and a binary decimal $$W_i = 0.a_i a_{i+\tau_2} \cdots a_{i+\tau_3}$$

is obtained by taking out the elements of M-sequence $\{d_i\}$ at a suitable interval and arranging the resultant elements, and is made to be a random number. This method is summarized in FIG. 6. The M-sequence $\{a_i\}$ satisfies the recurrence formula:

$$a_i = a_{i-p} + a_{i-q} \pmod{2}$$

As the result, $\{W_i\}$ is produced by the recurrence formula:

$$W_i = W_{i-p} \oplus W_{i-q}$$

where $\oplus$ is the exclusive logic sum of each bit.

The above two methods, however, have serious faults. In the Tausworthe method, a long time is required to generate random numbers. In the Lewis and Payne method, the uniformity becomes ambiguous. The uniformity of random numbers is not guaranteed by this method itself, and the presence of uniformity must be reviewed.

SUMMARY OF THE INVENTION

Therefore, it is the object of this invention to provide a pseudorandom number generator which shuffles the output sequence from a shift register circuit such as an M-sequence generator and outputs a resultant sequence, in which the characteristics of the random numbers are known from its configuration, so that the review of the characteristics is not needed, and the time required to generate random numbers is short.

More particularly, it is an object of this invention to provide a pseudorandom number generator to generate high-quality random numbers easily by the use of an M-series generator.

According to this invention a pseudorandom number generator includes a shift register circuit to generate a sequence which has "1" and "0" as its elements, and a matrix product circuit to receive a parallel output A from this shift register circuit and execute the matrix product of A×G, wherein A represents a vector and G represents a matrix.

DESCRIPTION OF A PREFERRED EMBODIMENT OF THE INVENTION

A preferred embodiment of this invention is described below.

Figure 1:
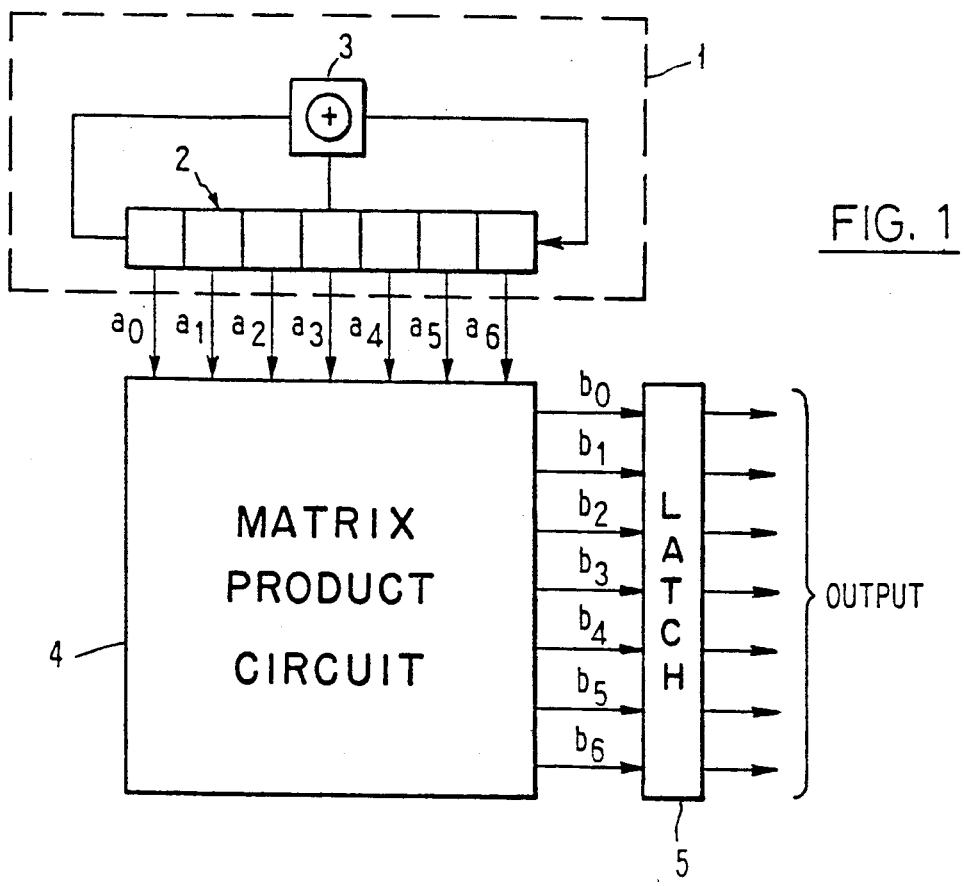
FIG. 1 is a block diagram showing an embodiment of this invention.
Figure 5:
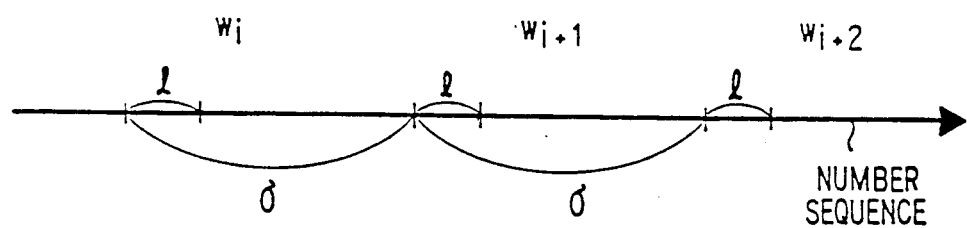
FIGS. 5 and 6 are diagrams to illustrate the Tausworthe method and the Lewis and Payne method, respectively.
Figure 6:
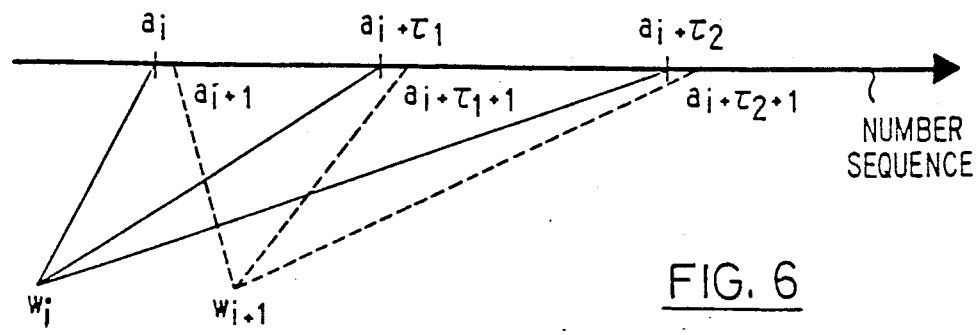

FIG. 1 shows this embodiment. In FIG. 1, the shift register circuit 1 consists of a 7-stage shift register 2 and an exclusive OR circuit 3. The characteristic equation of the shift register circuit 1 is $f(D) = D^7 + D^4 + 1$. The shift register circuit 1 is obviously an M-sequence generator, and has a period of $2^7 - 1$.

Outputs from each stage of the shift register 2 is supplied to the matrix product circuit 4 in parallel. This matrix product circuit 4 can be expressed by a matrix G.

$$G = \begin{bmatrix} 1 & 0 & 0 & 0 & 0 & 0 & 0 \\ 0 & 1 & 1 & 1 & 0 & 0 & 1 \\ 0 & 1 & 1 & 0 & 0 & 1 & 1 \\ 1 & 1 & 0 & 0 & 0 & 1 & 1 \\ 1 & 1 & 1 & 1 & 0 & 1 & 0 \\ 0 & 1 & 0 & 1 & 1 & 0 & 0 \\ 1 & 1 & 1 & 0 & 1 & 1 & 1 \end{bmatrix}$$

If the output component from each stage in the shift register 2 is $a_i$ (i=0 to 6), the output $b_j$ (j=0 to 6) of the matrix product circuit 4 is $b_j = {}_i\Sigma a_i g_{ji}$ (mod 2), where $g_{ji}$ is the component of the matrix G. The output of the matrix product circuit is once latched by the latch 5 and output as a binary decimal random number W.

$$W = 0. b_0 b_1 \ldots b_6$$

Figure 2:
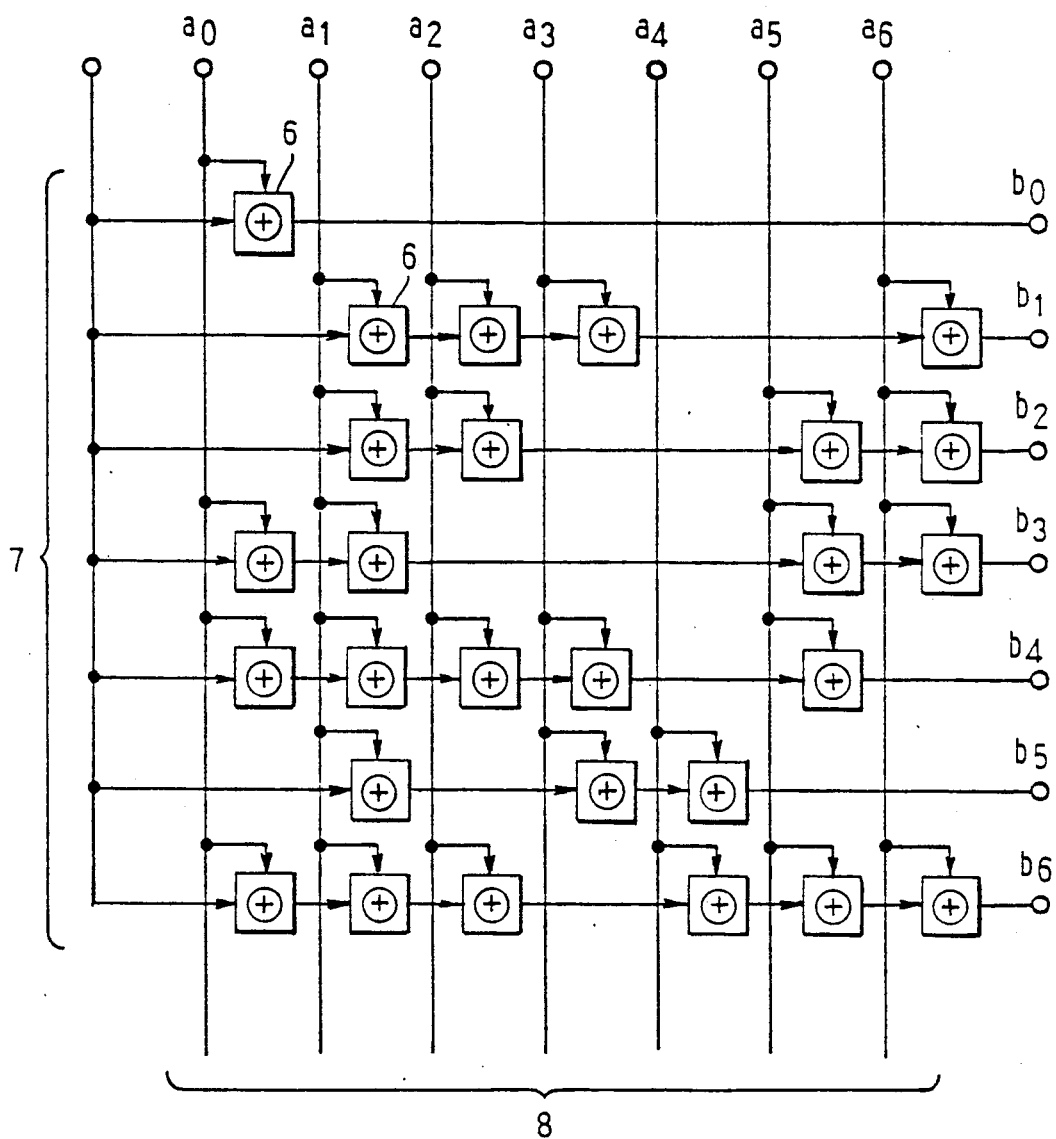
FIG. 2 is a circuit diagram showing a configuration of the matrix product circuit 4 of FIG. 1.

The matrix product circuit 4 has a preferable configuration, for example, as shown in FIG. 2. In FIG. 2, reference numbers 6, 7 and 8 designate an exclusive OR circuit, a row signal line, and a column signal line, respectively.

Figure 3:
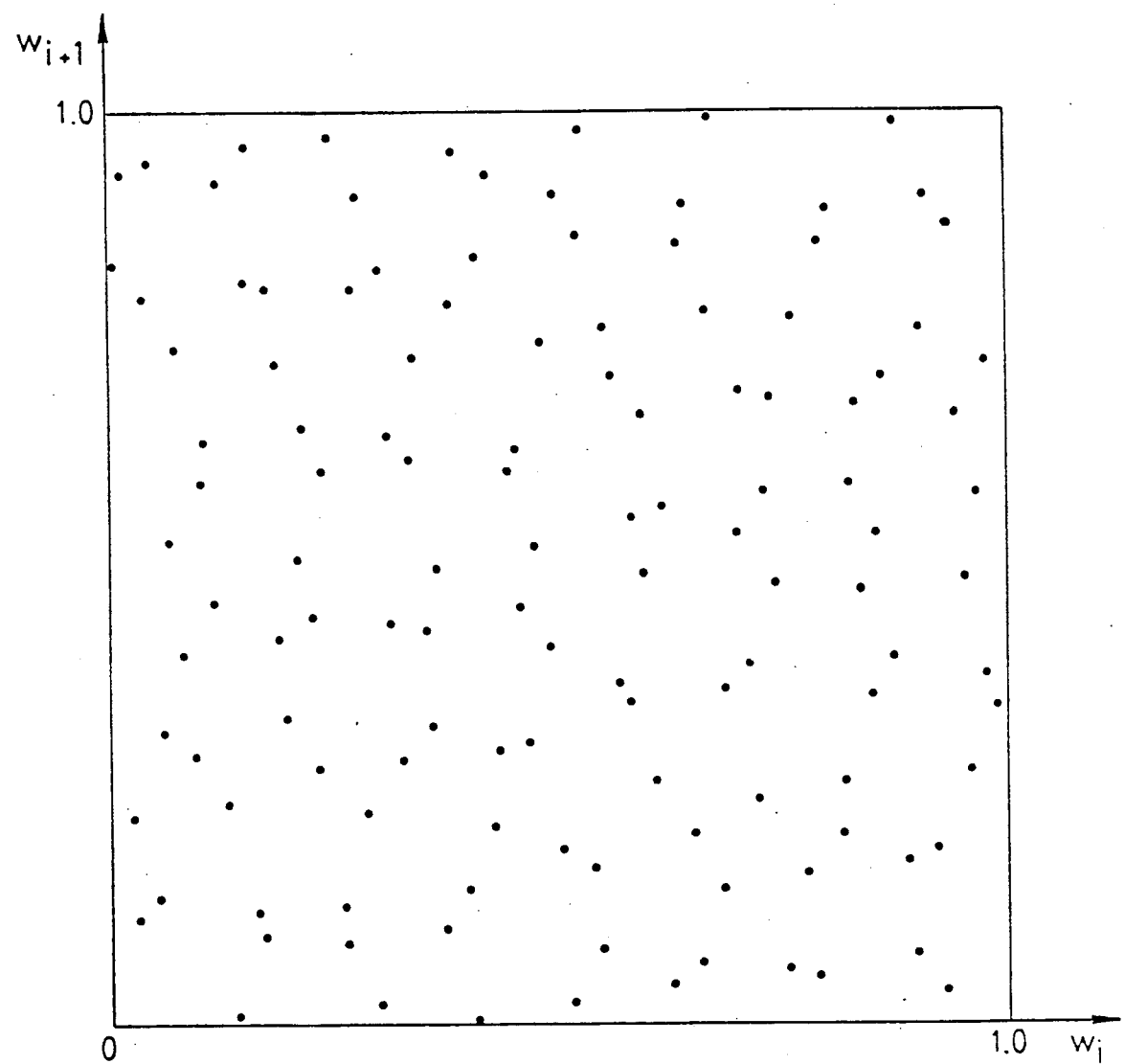
FIGS. 3 and 4 are diagrams to illustrate the embodiment of FIG. 1.

In order to explain the characteristics of random numbers generated from this pseudorandom number generator, a two-dimensional distribution is provided. This is shown in FIG. 3. The two-dimensional distribution is the distribution of consecutive random numbers $(W_i, W_{i+1})$. It can be seen that the distribution shown in FIG. 3 has no regularity but has uniformity. This means that two consecutive random numbers have no relationship, and the probability of random number generation is not biased to a particular value. Therefore, it is known that the random numbers generated by this pseudorandom number generator have superior characteristics. The superior characteristics will be discussed later.

Next, the meaning of the matrix G will be considered. Specifically, random numbers generated by the matrix G are 7-bit Lewis and Payne asymptotically random numbers. The meaning of an asymptotically random number will be discussed later.

First a concept of k-distribution will be introduced. This concept is a measurement of uniformity of random numbers. By way of definition, where the point whose coordinate components are k pieces of consecutive elements of a random number $\{W_i\}$ is represented by $x_i$, the random number $\{W_i\}$ is said to have a k-distribution when $p(x_i=x) = 2^{-kl}$ for an arbitrary point x in a k-dimensional hyperplane lattice (whose coordinate components can be represented by l-bit binary decimals). Here, probability p means a relative frequency throughout the period.

Since the coordinate components are l bits and the dimension is k, the number of points in the hyperplane lattice is $2^{lk}$. If $p(x_i=x) = 2^{-kl}$, it is obvious that the random number $\{W_i\}$ is uniformly distributed to each point x.

For the distribution of the sequence $\{W_i\}$ based on the M-sequence, k-distribution can be defined as follows:

if $(W_i, W_{i+1}, \ldots W_{i+k-1})$ is deemed to be kl sets, $\{W_i\}$ shows a k-distribution when sets in which all the components are 0's appear $2^{p-kl} - 1$ times, and all other patterns appear $2^{p-kl}$ times in a cycle. (It is obvious from this that $p \leq kl$.)

When simulation is performed using k pieces of consecutive random numbers, it will be obvious that a k-distribution is essential.

In order that Lewis and Payne random numbers show a k-distribution, it is necessary and sufficient that the random number $W_i$ be $$W_i = 0.a_{j1+i}, a_{j2+i} \ldots a_{jl+i}$$

$k = \lfloor p/l \rfloor$, and each row vector of the following matrix G is linear and independent. (For details, refer to Communications of the ACM, Vol. 26, pp. 516-523.)

$$\begin{bmatrix} A_{j1} \\ \vdots \\ A_{j1+k-1} \\ A_{j2} \\ \vdots \\ A_{j2+k-1} \\ \vdots \\ A_{jl} \\ \vdots \\ A_{jl+k-1} \end{bmatrix} = \begin{bmatrix} \hat{G} \\ (\hat{G} \text{ has } l.k \text{ rows and } p \text{ columns}) \end{bmatrix} \cdot \begin{bmatrix} A_1 \\ A_2 \\ \vdots \\ A_i \\ \vdots \\ A_p \end{bmatrix}$$

where $\{a_i\}$ is an M-sequence, p is the dimension of the M-sequence characteristic equation, p/l is the maximum integer not exceeding p/l, and $A_i$ is $(a_i a_{i+1} \ldots)$.

This is applied to random numbers of p=7 and l=7. First k=l/l=1. The requirements are met if the row vector of $G_7$ which satisfies $$\begin{bmatrix} A_{j1} \\ A_{j2} \\ A_{j3} \\ A_{j4} \\ A_{j5} \\ A_{j6} \\ A_{j7} \end{bmatrix} = [G_7] \cdot \begin{bmatrix} A_1 \\ A_2 \\ A_3 \\ A_4 \\ A_5 \\ A_6 \\ A_7 \end{bmatrix}$$

is linear and independent. The suffix 7 of $G_7$ indicates that l=7.

On the other hand, the random numbers of the embodiment shown in FIG. 1 can be expressed by $$\begin{bmatrix} A_{j1} \\ A_{j2} \\ A_{j3} \\ A_{j4} \\ A_{j5} \\ A_{j6} \\ A_{j7} \end{bmatrix} = \begin{bmatrix} 1 & 0 & 0 & 0 & 0 & 0 & 0 \\ 0 & 1 & 1 & 1 & 0 & 0 & 1 \\ 0 & 1 & 1 & 0 & 0 & 1 & 1 \\ 1 & 1 & 0 & 0 & 0 & 1 & 1 \\ 1 & 1 & 1 & 1 & 0 & 1 & 0 \\ 0 & 1 & 0 & 1 & 1 & 0 & 0 \\ 1 & 1 & 1 & 0 & 1 & 1 & 1 \end{bmatrix} \cdot \begin{bmatrix} A_1 \\ A_2 \\ A_3 \\ A_4 \\ A_5 \\ A_6 \\ A_7 \end{bmatrix}$$

In the above equation, it is obvious that the row vector of the matrix G is linear and independent. From this fact, it is known that random numbers output from the matrix circuit 4, $(a_{j1} a_{j2} \ldots a_{j7})$, $(a_{j1+1} a_{j2+1} \ldots a_{j7+1})$ are seven-bit Lewis and Payne random numbers showing one-dimensional distribution.

Next, the random numbers of this embodiment will be considered in relation to asymptotic random numbers.

In general when random numbers are used for the simulation of the Monte Carlo method and the like, the accuracy (bit length) required varies depending on the purpose. Therefore, it is desirable that a k-distribution is guaranteed for arbitrary bit lengths. Consider for example a sequence $a_{j1+i}, a_{j2+i}, a_{j3+i} \ldots$ when p=7. Let it be assumed that one-dimensional distribution (k=⌊7/7⌋=1) is established when the upper 7 bits of this sequence are selected as random numbers but two-dimension-distribution (k=⌊7/3⌋=2) is not established when the upper 3 bits of this sequence are selected random numbers. Then it is suitable to obtain random numbers of l=7 from this sequence, but it is not suitable to obtain those of l=3. This is inconvenient.

Asymptotic random numbers are random numbers from which the above inconvenience is eliminated. These can be defined as follows.

Lewis and Payne random numbers which satisfy the following two conditions are defined as asymptotically random S-bit Lewis and Payne random numbers.

Condition 1

The row vector of the matrix $\hat{G}_l$ is linear and independent for arbitrary $l(\leq s)$ Condition 2

The cycle is a prime number.

Condition 2 is needed to respond to the following requirement. In general, in the case where random numbers are used in k-dimensional simulation, k sets of unoverlapped and uniformly distributed random numbers $W_i(W_{kl}, W_{kl+1}, \ldots W_{kl+k-1})$ are used. Condition 2 is necessary to assure k-distribution for this sequence.

It is considered whether random numbers generated in the embodiment shown in FIG. 1 are asymptotic random numbers or not. When l=7, since k=1 and the following equation is met, $$\begin{bmatrix} A_{j1} \\ A_{j2} \\ A_{j3} \\ A_{j4} \\ A_{j5} \\ A_{j6} \\ A_{j7} \end{bmatrix} = \begin{bmatrix} 1000000 \\ 0111001 \\ 0110011 \\ 1100011 \\ 1111010 \\ 0101100 \\ 1110111 \end{bmatrix} \cdot \begin{bmatrix} A_1 \\ A_2 \\ A_3 \\ A_4 \\ A_5 \\ A_6 \\ A_7 \end{bmatrix}$$

it is obvious that linear uniform distribution is established.

When l=4, 5 or 6, k=1 and the following equations are derived from the above.

$$\begin{bmatrix} A_{j1} \\ A_{j2} \\ A_{j3} \\ A_{j4} \end{bmatrix} = \begin{bmatrix} 1000000 \\ 0111001 \\ 0110011 \\ 1100011 \end{bmatrix} \cdot \begin{bmatrix} A_1 \\ A_2 \\ A_3 \\ A_4 \\ A_5 \\ A_6 \\ A_7 \end{bmatrix}$$

$$\begin{bmatrix} A_{j1} \\ A_{j2} \\ A_{j3} \\ A_{j4} \\ A_{j5} \end{bmatrix} = \begin{bmatrix} 1000000 \\ 0111001 \\ 0110011 \\ 1100011 \\ 1111010 \end{bmatrix} \cdot \begin{bmatrix} A_1 \\ A_2 \\ A_3 \\ A_4 \\ A_5 \\ A_6 \\ A_7 \end{bmatrix}$$

and $$\begin{bmatrix} A_{j1} \\ A_{j2} \\ A_{j3} \\ A_{j4} \\ A_{j5} \\ A_{j6} \end{bmatrix} = \begin{bmatrix} 1000000 \\ 0111001 \\ 0110011 \\ 1100011 \\ 1111010 \\ 0101100 \end{bmatrix} \cdot \begin{bmatrix} A_1 \\ A_2 \\ A_3 \\ A_4 \\ A_5 \\ A_6 \\ A_7 \end{bmatrix}$$

From these equations, it is obvious that one-dimensional uniform distribution is established when l=4, 5 or 6.

When l=3, k=⌈7/3⌉=2, and the following equation is derived from $G_7$ above, $$\begin{bmatrix} A_{j1} \\ A_{j1+1} \\ A_{j2} \\ A_{j2+1} \\ A_{j3} \\ A_{j3+1} \end{bmatrix} = \begin{bmatrix} \underline{1000000} \\ 0111001 \\ \underline{0111001} \\ 0110011 \\ \underline{0110011} \end{bmatrix} \cdot \begin{bmatrix} A_1 \\ A_2 \\ A_3 \\ A_4 \\ A_5 \\ A_6 \\ A_7 \end{bmatrix}$$

It is noted that row vectors of 2nd, 4th and 6th rows indicated by horizontal lines are primarily determined by row vectors of 1st, 3rd and 5th rows, respectively as follows. Where an arbitrary row vector among 1st, 3rd and 5th row vectors is represented by $\bar{g}_j$, the row vector among 2nd, 4th and 6th row vectors corresponding to $\bar{g}_j$ is represented by $\bar{g}_{j+1}$, and $\bar{g}$ is expressed by $(g_1, g_2, g_3, \ldots g_7)$. $\bar{g}_{j+1}$ can be obtained from $\bar{g}_j$ as follows:

$g_{j+1,1} = g_{j,7}$
$g_{j+1,2} = g_{j,1}$
$g_{j+1,3} = g_{j,2}$
$g_{j+1,4} = g_{j,3} + g_{j,7}$
$g_{j+1,5} = g_{j,4}$
$g_{j+1,6} = g_{j,5}$
$g_{j+1,7} = g_{j,6}$

For example, since the row vector of the 3rd row $\bar{g}_{j2}=(0111001)$, the row vector of the 4th row $\bar{g}_{j2+1}=(1010100)$. Similarly, row vectors of 2nd and 6th rows are obtained, and the following matrix $\hat{G}_3$ is obtained.

$$G_3 = \begin{bmatrix} 1000000 \\ 0100000 \\ 0111001 \\ 1010100 \\ 0110011 \\ 1010001 \end{bmatrix}$$

Since each row vector in this matrix $\hat{G}_3$ is linear and independent, it is known that random numbers of this embodiment show two-dimensional uniform distribution when l=3.

Next, the fact that the row vector $\bar{g}_{j+1}$ is primarily determined from the row vector $\bar{g}_j$ will be considered.

As described above, when l=3 and k=2, the following equation is satisfied.

$$\begin{bmatrix} A_{j1} \\ A_{j1+1} \\ A_{j2} \\ A_{j2+1} \\ A_{j3} \\ A_{j3+1} \end{bmatrix} = [\hat{G}_3] \cdot \begin{bmatrix} A_1 \\ A_2 \\ A_3 \\ A_4 \\ A_5 \\ A_6 \\ A_7 \end{bmatrix}$$

From this equation, $A_j$ ($A_{j1}$, $A_{j2}$ or $A_{j3}$) is given by $$A_j = g_{j,1} \cdot A_1 + g_{j,2} \cdot A_2 + g_{j,3} \cdot A_3 + g_{j,4} \cdot A_4 + g_{j,5} \cdot A_5 + sg_{j,6} \cdot A_6 + g_{j,7} \cdot A_7$$

In the above equation, if the phase of the sequence A is shifted by 1, $$\begin{bmatrix} A_{j1+1} \\ A_{j1+2} \\ A_{j2+1} \\ A_{j2+2} \\ A_{j3+1} \\ A_{j3+2} \end{bmatrix} = [\hat{G}_3] \cdot \begin{bmatrix} A_2 \\ A_3 \\ A_4 \\ A_5 \\ A_6 \\ A_7 \\ A_8 \end{bmatrix}$$

is obtained. Thus, the following equation is satisfied.

$$A_{j+1} = g_{j,1} \cdot A_2 + g_{j,2} \cdot A_3 + g_{j,3} \cdot A_4 + g_{j,4} \cdot A_5 + g_{j,5} \cdot A_6 + g_{j,6} \cdot A_7 + g_{j,7} \cdot A_8$$

Since $a_i = a_{i-p} + a_{i-q}$ in a Lewis and Payne sequence $\{a_i\}$ ($f(D) = D^p + D^q + 1$), $A_8 = A_1 + A_4$. Consequently, $A_{j+1}$ can be arranged as $$A_{j+1} = g_{j,7} \cdot A_1 + g_{j,1} \cdot A_2 + g_{j,2} \cdot A_3 + (g_{j,3} + g_{j,7}) \cdot A_4 + g_{j,4} \cdot A_5 + g_{j,5} \cdot A_6 + g_{j,6} \cdot A_7$$

It can be understood from the above that $\bar{g}_{j+1}$ can be obtained from $\bar{g}_j$.

Although only $\bar{g}_{j+1}$ and $\bar{g}_j$ have been described, it is matter of course that $\bar{g}_{j+2}$, $\bar{g}_{j+3}$ ... can be obtained from $\bar{g}_{j+1}$, $\bar{g}_{i+2}$ ..., respectively. Since this can be proved from the above, it is not repeated.

Let us return to the consideration of the asymptotic randomness of this embodiment. When $l=2$, $k=\lfloor 7/2 \rfloor = 3$. From $\hat{G}_6$ and $\hat{G}_3$ along with these l and k, the following is derived $$\begin{bmatrix} A_{j1} \\ A_{j1+1} \\ A_{j1+2} \\ A_{j2} \\ A_{j2+1} \\ A_{j2+2} \end{bmatrix} = \begin{bmatrix} 1000000 \\ 0100000 \\ \overline{0111001} \\ \overline{1010100} \end{bmatrix} \cdot \begin{bmatrix} A_1 \\ A_2 \\ A_3 \\ A_4 \\ A_5 \\ A_6 \\ A_7 \end{bmatrix}$$

In this case also, row vectors indicated by horizontal lines are determined from the row vectors immediately above them, and $\hat{G}_2$ is obtained as follows.

$$\hat{G}_2 = \begin{bmatrix} 1000000 \\ 0100000 \\ 0010000 \\ 0111001 \\ 1010100 \\ 0101010 \end{bmatrix}$$

Since each row vector is linear and independent, it is understood that three-dimensional uniform distribution is established.

When $l=1$, $k=\lfloor 7/1 \rfloor = 7$. From $\hat{G}_7$, $\hat{G}_3$ and $\hat{G}_2$ along with these l and k, the following is derived:

$$\begin{bmatrix} A_{j1} \\ A_{j1+1} \\ A_{j1+2} \\ A_{j1+4} \\ A_{j1+5} \\ A_{j1+6} \end{bmatrix} = \begin{bmatrix} 1000000 \\ 0100000 \\ 0010000 \\ \overline{\phantom{0000000}} \\ \overline{\phantom{0000000}} \\ \overline{\phantom{0000000}} \end{bmatrix} \cdot \begin{bmatrix} A_1 \\ A_2 \\ A_3 \\ A_4 \\ A_5 \\ A_6 \\ A_7 \end{bmatrix}$$

In this case also, row vectors indicated by horizontal lines are sequentially determined from row vectors immediately above them, and $\hat{G}_3$ is obtained as follows:

$$\hat{G}_3 = \begin{bmatrix} 1000000 \\ 0100000 \\ 0010000 \\ 0001000 \\ 0000100 \\ 0000010 \\ 0000001 \end{bmatrix}$$

Since each row vector is linear and independent, it is known that a 7-dimensional uniform distribution is established.

It is known from the above that the random numbers of this embodiment are asymptotic 7-bit random numbers.

Figure 4:
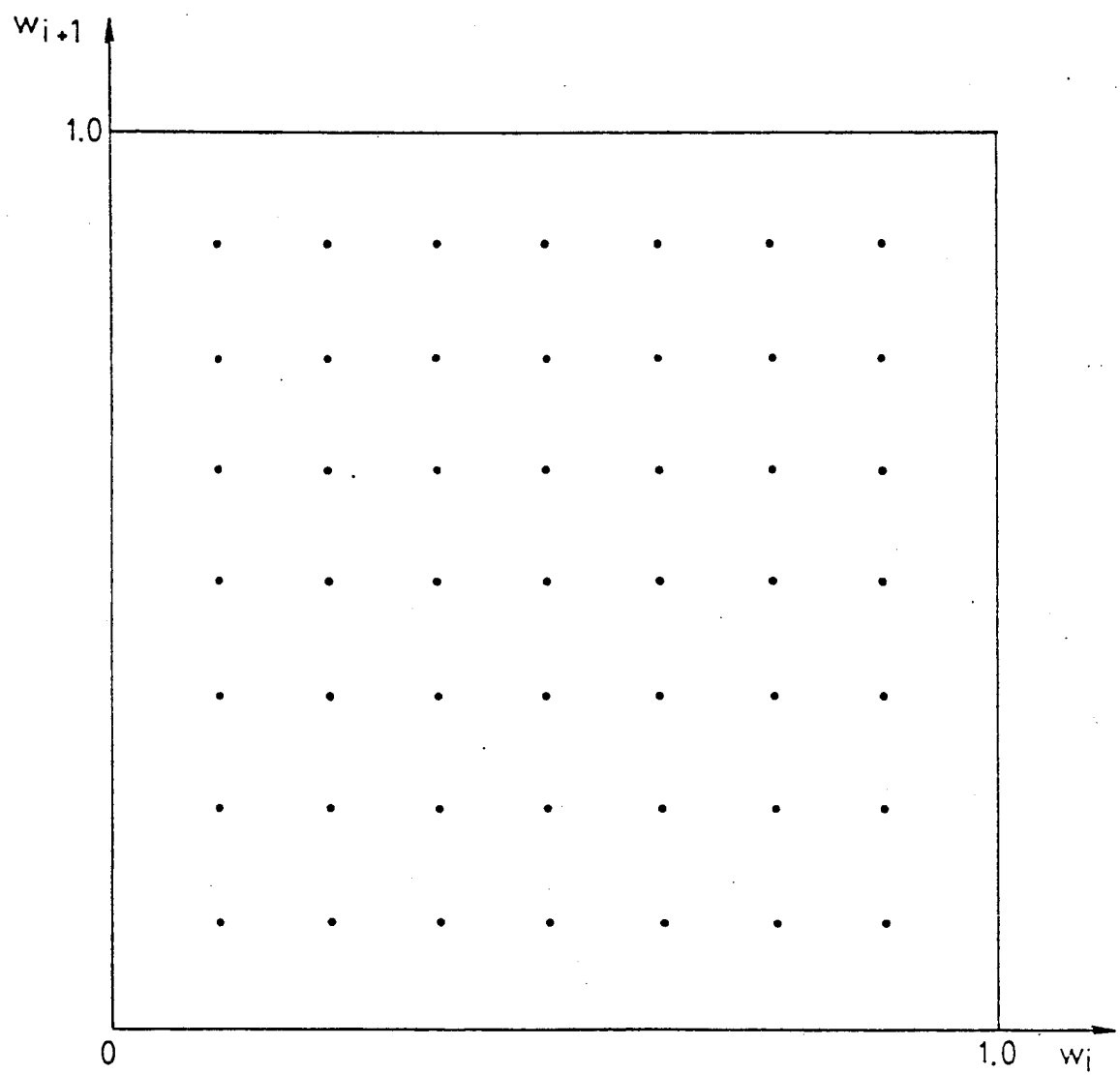

FIG. 4 shows a two-dimensional uniform distribution where the upper 3 bits of random numbers of this embodiment are used, whereas FIG. 3 shows two-dimensional distribution where all the bits including the lower 4 bits are used. It is seen from FIG. 3 that the regularity of two-dimensional distribution disappears with the lower 4 bits. The disappearance of regularity can be achieved by elevating the rank of the matrix consisting of 4th to 7th row vectors of the matrix G corresponding to the lower 4 bits.

Next, the method for determining the matrix G of the embodiment will be described. In order to generate asymptotic 7-bit random numbers, row vectors are determined sequentially from $l=1$ to $l=7$ so as to establish k-dimensional uniform distribution.

$l=1$

First, an arbitrary row vector of the matrix $\hat{G}_1$ is set. As understood from the above, other row vectors are primarily determined. Next, whether or not each row vector of the matrix $\hat{G}_1$ thus obtained is linear and independent is checked. If it is linear and independent, this matrix $\hat{G}_1$ is selected as the normal one. If it is not linear and independent, the row vector first set is replaced by another and the same procedure is performed.

For example if the first row vector of the matrix $\hat{G}_1$ is (1000000), the matrix $\hat{G}_1$ is as follows:

$$\hat{G}_1 = \begin{bmatrix} 1000000 \\ 0100000 \\ 0010000 \\ 0001000 \\ 0000100 \\ 0000010 \\ 0000001 \end{bmatrix}$$

Since each row vector of this matrix $\hat{G}_1$ is linear and independent, it can be selected as the normal one. By this selection, 7-dimensional distribution when l=1 is assured.

l=2

The row vectors of the 1st, 2nd and 3rd rows of the matrix $\hat{G}_2$ are equal to the row vectors of the 1st, 2nd and 3rd rows of the matrix $\hat{G}_1$. $\hat{G}_2$ is as follows:

$$\hat{G}_2 = \begin{bmatrix} 1000000 \\ 0100000 \\ 0010000 \\ \underline{\phantom{0000000}} \\ \underline{\phantom{0000000}} \\ \underline{\phantom{0000000}} \end{bmatrix}$$

The row vectors indicated by horizontal lines are obtained in the same way as in l=1. That is, an arbitrary row vector is established so that each row vector of the matrix $\hat{G}_2$ obtained is linear and independent.

For example, if the row vector of the 4th row is (0111001), the matrix $\hat{G}_2$ is as follows:

$$\hat{G}_2 = \begin{bmatrix} 1000000 \\ 0100000 \\ 0010000 \\ 0111001 \\ 1010100 \\ 0101010 \end{bmatrix}$$

Since each row vector of this matrix $\hat{G}_2$ is linear and independent, it can be selected as the normal one. By this selection, three-dimensional distribution when l=2 is assured.

l=3

The row vectors of the 1st, 2nd, 3rd and 4th rows of the matrix $\hat{G}_3$ are equal to the row vectors of 1st, 2nd, 4th and 5th rows of $\hat{G}_2$. $\hat{G}_3$ is as follows:

$$\hat{G}_3 = \begin{bmatrix} 1000000 \\ 0100000 \\ 0111001 \\ 1010100 \end{bmatrix}$$

In this case also, the row vectors of the 5th and 6th rows are adequately selected as described above, and the matrix $\hat{G}_3$ satisfying two-dimensional distribution is obtained. For example, the matrix $\hat{G}_3$ is as follows:

$$\hat{G}_3 = \begin{bmatrix} 1000000 \\ 0100000 \\ 0111001 \\ 1010100 \\ 0110011 \\ 1010001 \end{bmatrix}$$

l=4, 5, 6 or 7

For l=4, 5, 6 or 7, undetermined row vectors in matrices $\hat{G}_4$, $\hat{G}_5$, $\hat{G}_6$ or $\hat{G}_7$ are determined in a similar way. Examples of matrices $\hat{G}_4$, $\hat{G}_5$, $\hat{G}_6$ and $\hat{G}_7$ thus obtained are as follows. Underscored row vectors are those determined anew:

$$\hat{G}_4 = \begin{bmatrix} 1000000 \\ 0111001 \\ 0110011 \\ \underline{1100011} \end{bmatrix}$$

$$\hat{G}_5 = \begin{bmatrix} 1000000 \\ 0111001 \\ 0110011 \\ 1100011 \\ \underline{1111010} \end{bmatrix}$$

$$\hat{G}_6 = \begin{bmatrix} 1000000 \\ 0111001 \\ 0110011 \\ 1100011 \\ 1111010 \\ \underline{0101100} \end{bmatrix}$$

$$\hat{G}_7 = \begin{bmatrix} 1000000 \\ 0111001 \\ 0110011 \\ 1100011 \\ 1111010 \\ 0101100 \\ \underline{1110111} \end{bmatrix}$$

Such matrices $\hat{G}_4$, $\hat{G}_5$, $\hat{G}_6$ and $\hat{G}_7$ assure single-dimensional distribution.

The fact that the matrix $\hat{G}_7$ is used as the matrix G of the matrix product circuit 4 has already been described. It will not be required to describe that the random numbers of the 7-dimensional uniform distribution is obtained when the upper 1 bit of output of the matrix product circuit 4 is used, and that random numbers of three-dimensional and 4-dimensional distribution are obtained by using the upper 2 bits and 3 bits, respectively.

Of course, this invention is not limited to the details of the configuration of the embodiment described above.

For example, although asymptotic 7-bit random numbers are generated in the above description, the bit number can be selected arbitrarily. For example, asymptotic 31-bit random numbers may be generated with the matrix product circuit which realizes the following matrix. The characteristic equation is $f(D) = D^{31} + D^{28} + 1$.

$$G = \begin{bmatrix}
1000000000000000000000000000000 \\
1001001000010111010110001001111 \\
0110101101011001001111010000101 \\
0100010011101001110000000000000 \\
0010101111001000110000000000000 \\
1000100011010100100011111001010 \\
0001110010110000010000000000000 \\
0110010110000110101000001010011 \\
\\
0101100010110000011100100010001 \\
0111111100010010011111000000011 \\
0010001111010111000110101100001 \\
1111011011001101011110110100000 \\
1000010100001100001010110101011 \\
0101000001111011011000110000100 \\
0000010011010110110110000000111 \\
0111001011000001000000000000000 \\
\\
0100011110101110001101011000010 \\
1101110110011010111101101000001 \\
0010101000010000101011010110111 \\
1011000111101101100011000001000 \\
0000100110101101101100000000110 \\
0000110110111000110100000011000 \\
1010111110010000101001110111010 \\
1111000101111010011001111011010 \\
\\
1100100100010000000100101111011 \\
0000110010001100101101000100011 \\
1100010100011110000111110010000 \\
1000100010100100010111010010101 \\
1110000101101100101100111110000 \\
1110010001001110000010111101010 \\
0001010101001001001110001000100
\end{bmatrix}$$

According to this invention, as described above, shuffling is performed by supplying the output of the shift register circuit to the matrix circuit. Thus, the time required for the generation of random numbers can be reduced. Since the characteristics of random numbers obtained can be known from the matrix of the matrix product circuit, no review of characteristics is required.

Besides by adequately selecting the matrix in the matrix product circuit, asymptotic s-bit random number can be generated easily.

I claim:

1. A pseudorandom number generator comprising:
   a polynomial circuit comprising a feedback shift register; and
   matrix multiplication means for receiving parallel data from said feedback shift register and performing matrix multiplication $A \times G$ wherein A is a vector and G is a matrix.

2. A pseudorandom number generator comprising:
   a polynomial circuit shift register storing a vector A;
   an exclusive-OR gate receiving as inputs two bit values of said shift register, the output of said exclusive-OR gate being input to said shift register; and
   means for matrix multiplying the vector A in said shift register by a shuffling matrix G wherein the multiplying of one A vector after another by the matrix G produces asymptotic random numbers in succession.

3. A pseudorandom number generator comprising:
   an M-sequence generator having a plurality of stages $a_i$; and
   a matrix product circuit which combines a matrix G having components $g_{ji}$ with the stages $a_i$ to provide output elements $b_j$ of a number, each $b_j$ being represented by the expression, $$b_j = \Sigma a_i g_{ji}$$

wherein the numbers formed of $b_j$ elements are asymptotic random numbers having a uniform k distribution.

4. A pseudorandom number generator as in claim 3 wherein each row vector of G is linear and independent.

5. A pseudorandom number generator as in claim 3 wherein the M-sequence generator comprises (a) shift register and (b) a gate which exclusively ORs at least two stages of the shift register and directs the result as input to a stage of the shift register.

6. A pseudorandom number generator as in claim 5 wherein the shift register has seven stages and wherein said gate exclusively ORs the bit of one end stage $a_0$ with the bit of the middle stage $a_3$, the result being input to bit of the other end stage $a_6$.

7. A method for generating l-bit pseudorandom numbers by using a feedback shift register having a polynomial characteristic equation of degree p, said shift register having stages which contain bit values where l is less than or equal to p, the method comprising the steps of:
   combining the current bit values of preselected stages of the shift register, the combined result being shifted into the shift register as the next input;
   forming a matrix G; and
   multiplying, in a matrix product circuit, the bit values contained in the stages of the shift register by the formed matrix G for successive shift register shifts, wherein successive products of the multiplying in response to successive shifts represents successive uniform k-distribution random numbers characterized by asymptoticity.

8. The method of claim 7 wherein the step of forming the matrix G comprises the step of:
   forming one $\hat{G}_L$ matrix after another for successive values of L, where L is less than or equal to p, wherein each matrix $\hat{G}_L$ has rows which are linear and independent;
   the $\hat{G}_L$ matrix, for the highest L, comprising the G matrix.

9. The method of claim 8 wherein the forming of $\hat{G}_L$ matrixes comprises the steps of:
   for L=1, selecting an arbitrary row vector $v_L$ and deriving the remaining row vectors from $v_L$;
   for L greater than 1, (i) extracting some row vectors from previously formed matrixes of lesser L value and (ii) arbitrarily selecting a vector $v_L$ for a non-extracted row and deriving the remaining non-extracted rows from the selected vector $v_L$; and
   for each L, re-selecting the vector $v_L$ if each row vector in matrix $\hat{G}_L$ is not linear and independent and re-deriving the remaining rows for the matrix $\hat{G}_L$ with the re-selected vector $v_L$;
   row vectors in each $\hat{G}_L$ matrix being extracted from only a previously formed $\hat{G}_L$ matrix having only linear and independent rows.

* * * * *